United States Patent
Liu et al.

(10) Patent No.: US 7,180,886 B2
(45) Date of Patent: Feb. 20, 2007

(54) SYNCHRONIZED DATA COMMUNICATION ON A ONE-WIRED BUS

(75) Inventors: Jing-Meng Liu, Hsinchu (TW); Kent Hwang, Taoyuan (TW); Chao-Hsuan Chuang, Hsinchu (TW); Cheng-Hsuan Fan, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 1019 days.

(21) Appl. No.: 10/153,784

(22) Filed: May 24, 2002

(65) Prior Publication Data

US 2003/0219004 A1 Nov. 27, 2003

(51) Int. Cl.
*H04J 3/06* (2006.01)
*H04L 12/50* (2006.01)

(52) U.S. Cl. .................. 370/350; 370/364; 370/503
(58) Field of Classification Search ........ 370/347–350, 370/364–503, 535–544; 709/232
See application file for complete search history.

(56) References Cited

U.S. PATENT DOCUMENTS

| | | | | |
|---|---|---|---|---|
| 3,983,506 A * | 9/1976 | Rettinger et al. ............ 331/17 |
| 4,071,889 A * | 1/1978 | Sumida et al. ............ 713/400 |
| 4,723,164 A * | 2/1988 | Nienaber .................... 348/495 |
| 4,815,106 A * | 3/1989 | Propp et al. ................ 375/257 |
| 5,272,694 A * | 12/1993 | Bourgart et al. ........... 370/296 |
| 5,412,783 A * | 5/1995 | Skokan ...................... 710/105 |
| 5,673,133 A * | 9/1997 | Imaoka et al. ............. 398/202 |
| 6,028,443 A * | 2/2000 | Ozaki ......................... 326/16 |
| 6,151,336 A * | 11/2000 | Cheng et al. ............... 370/535 |
| 6,369,665 B1 * | 4/2002 | Chee et al. ................. 331/143 |
| 6,608,571 B1 * | 8/2003 | Delvaux ...................... 341/53 |
| 6,754,841 B2 * | 6/2004 | Yang .......................... 713/503 |
| 2004/0255208 A1 * | 12/2004 | Giovinazzi et al. ......... 714/700 |

* cited by examiner

*Primary Examiner*—Man U. Phan
(74) *Attorney, Agent, or Firm*—Rosenberg, Klein & Lee

(57) ABSTRACT

In a synchronized data communication on a one-wired bus, it transmits and receives a synchronizing signal that segments part of or all proportions of the data signal by use of three electrically distinguishable statuses for the identifier of the synchronizing signal and the logic states of the data signal to increase the endurance of frequency displacement and resist influences of the interference of external conditions, low quality of transmission medium, and limitation of transmission distance and make the reliability and correctness of the signal transmission improve substantially. It is also clearly illustrated the feasibility and simplicity for implementing the one-wired synchronized communication by a plurality of exemplary signal types and a transceiver circuitry.

23 Claims, 8 Drawing Sheets

SYNCHRONIZED DATA COMMUNICATION ON A ONE-WIRED BUS

FIELD OF THE INVENTION

The present invention relates generally to a synchronized data communication and, more particularly, to a communication scheme with synchronized data communication modes on one-wired bus, by which synchronized signal transmission and receiving through single transmission line or single wire is achieved.

DESCRIPTION OF RELATED ART

In general, traditional data transmission with data bus can be divided into synchronized data communication and non-synchronized data communication, and both of them are able to reach the function of transmitting binary signals, which are represented by binary code "0" and "1". Binary signals can be applied for control signals, information signals and addressing signals, and so on, for carrying various types of data.

When using non-synchronized data communications to proceed to signal transmissions, the transmitted binary signals are transmitted from a non-synchronized data communication transmitter, which transmits the binary signals in the form of continuous binary signal clusters. The transmission of binary signal clusters is probably degraded of its correctness of transmission by the influence of interference of external conditions, clock rate drifting, clock duty drifting, low quality of transmission medium, and limitation of transmission distance.

On the other hand, synchronized data communications have much better performance and data robustness than non-synchronized method. However, conventionally synchronized communication scheme needs at least two wires or two transmission media, one for synchronizing clock and the other for data signal. Synchronized communication cannot be implemented with one wire or single transmission medium by conventional method. Erecting cost is thus increased for at least two transmission media or two wires to reach the function of synchronicity. The two conventional transmission methods have their own deficiency and rely on related proprietors to bring up new transmission scheme different from the current ones.

SUMMARY OF THE INVENTION

One object of the present invention is to provide a synchronized data communication scheme on one-wired bus. Synchronized signal segments partial of or all proportions of data signal to be continuous transmission signal clusters and to simultaneously proceed to the synchronized data communications by means of only single transmission line as the medium to reduce the occupied space of the transmission medium, resource waste, and cost.

Another object of the synchronized data communication on one-wired bus is to provide signal transmission that increases the endurance of frequency displacement and resist influences of the interference of external conditions, low quality of transmission medium, and limitation of transmission distance, and makes reliability and correctness of signal transmission improved substantially.

According to the present invention, a synchronized data communication on one-wired bus comprises three signal statuses of electrically distinguishable states, for example, "High", "Low" and "High-Impedance" state, to form a continuous transmission signal cluster of tri-state signal. During transmission the three electrically distinguishable states of the continuous transmission signal cluster of tri-state signal can be assigned arbitrarily one of the three electrical states or one transition edge between the three electrical states to be the key identifier for the synchronizing signal, and the key identifier itself or a signal cluster including the key identifier can be assigned as the synchronizing signal that defines the unit cycle and offers synchronicity of the signal transmission and receiving through the bus. The data signal can be then composed with any electrical states or any transition edges between the electrical states that does not include the key identifier.

For better understanding of this invention, it is necessary to explain more about the importance of the key identifier and the necessity of the tri-state electrical signal. Up to now, any conventional communication modes through single wire are absolutely "electrically" in the non-synchronized modes, even there may be some kind of synchronizing signal clusters to define the unit data cluster. Since either the synchronizing signal clusters or the data signal clusters are formed with the same two electrical states, "High" and "Low", or "1" and "0", no electrical key identifier can be defined for distinguishing the synchronizing signals from the data signals even use of the transition edges, and thus the circuit is actually constructing or interpreting the electrical "High" and "Low" sequence when encoding or decoding the signal clusters, and it is exactly the behavior of non-synchronized communications.

Contrarily, in the present invention the electrical key identifier is very clear since it is a distinguishable electrical state or transition edge that will not be used for the data signal clusters. Furthermore, it can be properly designed to own very special electrical characteristics that can be identified with simple circuitry within a clock cycle, and that is why the tri-state electrical signal are needed.

Roughly to say, any time the receiver circuit of the present invention identifies a key identifier, it knows a new data cycle arrives, and thus the data bits or data clusters can be clearly partitioned bit by bit or cluster by cluster, thereby the communication modes will be very resistant to clock skew since every bits or every clusters are well partitioned. Further, the spirit of the present invention is that the key identifier itself is robust and can be easily identified independent of the system clocking condition. In this way, a communication scheme with one-wired bus to perform the same data robustness as the conventional multi-wired synchronized communication modes can be implemented.

BRIEF DESCRIPTION OF THE DRAWINGS

The above and other features and advantages of the present invention will become apparent in the following detailed description of the preferred embodiment of the invention, with reference to the accompanying drawings, in which.

DETAILED DESCRIPTION OF THE INVENTION

Figure 1:
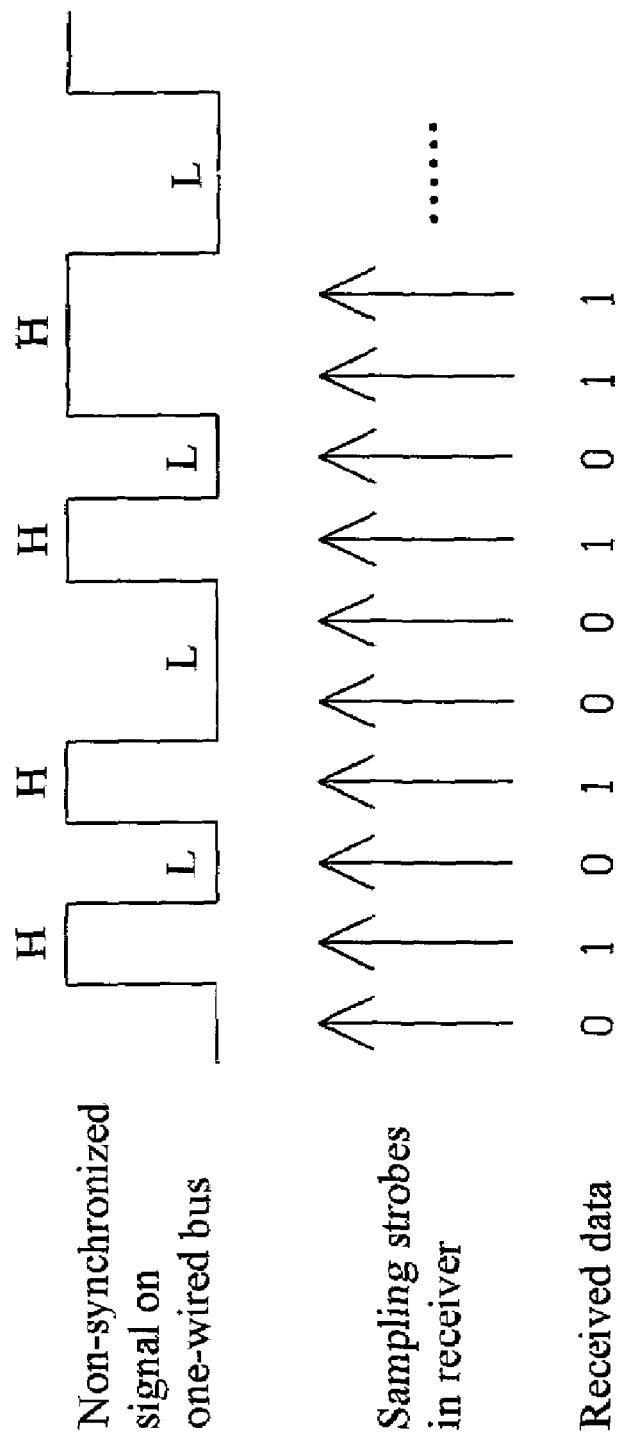
FIG. 1 is a conventional one-wired bus non-synchronized communication signal and the detection methodology in receiver.

Referring to FIG. 1, in a one-wired bus non-synchronized communication scheme the data is transmitted and received at certain bit rate and the receiver samples the data with a fixed strobe timing. The non-synchronized signal has two electrically distinguishable states "High" and "Low" typically representing logic "1" and "0", and the identified data is determined by the strobed electrical state. Once the clock misaligned between transmitter and receiver, the data cannot be correctly read out. Such communication mode is thus only suitable for low speed or short distance communication, which tolerates large timing skew.

Figure 2:
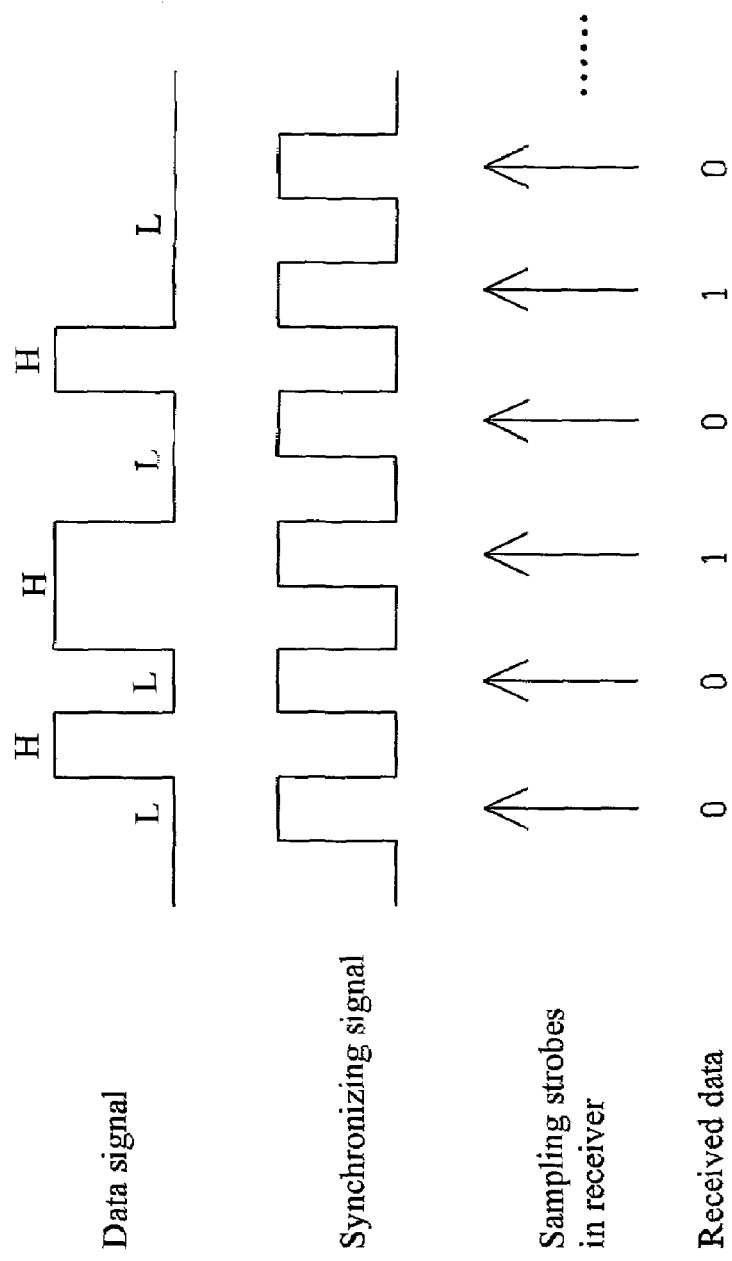
FIG. 2 is a conventional synchronized communication signal with a two-wired or multi-wired bus.

Referring to FIG. 2, in a multi-wired synchronized communication system a synchronizing signal is transmitted and received by an independent wire in addition to the data bus. The data signal also has two electrically distinguishable states "High" and "Low" typically representing logic "1" and "0". However, the strobe timing of the receiver for sampling the data signal is aligned with the synchronizing clock. The interpreted data is therefore determined by the electrical state of the data signal gated by the synchronizing signal. This kind of communications can provide communications of higher speed, longer distance and better quality, but needs at least two wires for constructing the transmission system.

Figure 3:
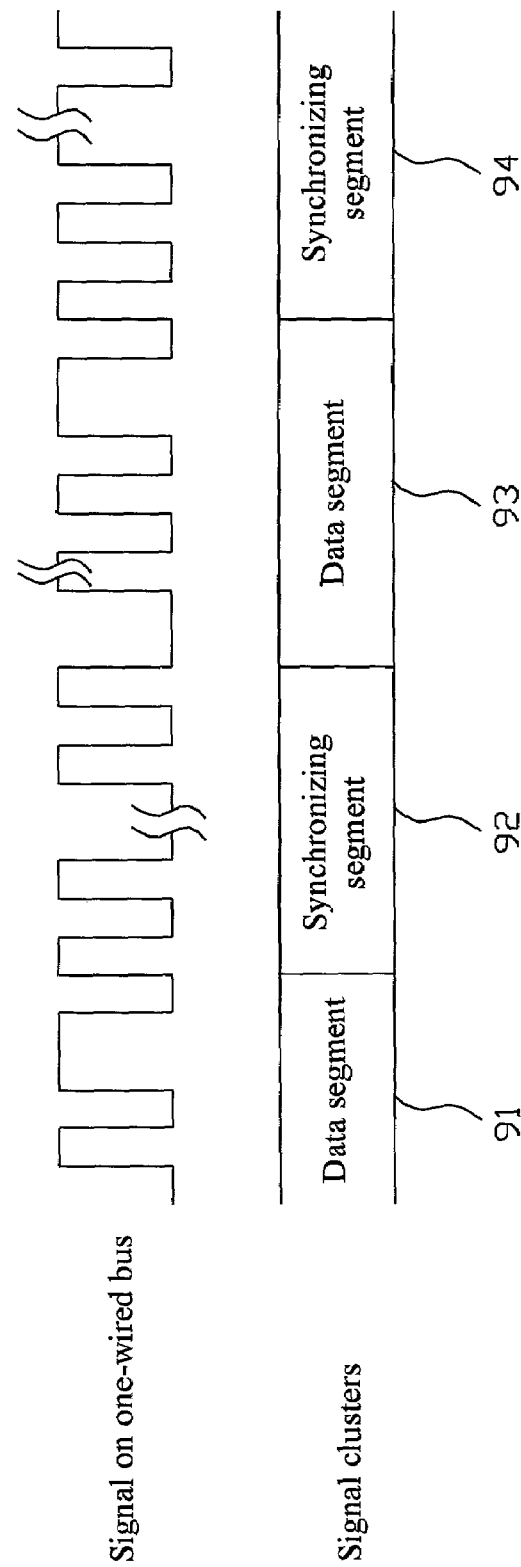
FIG. 3 is a conventional one-wired bus non-synchronized communication signal with inserted synchronizing signal element in special coding, which needs decoding efforts before clock alignment.

The scheme shown in FIG. 3 is basically similar to that in FIG. 1 except for the periodic insertion of a specially coded signal, which can be decoded and recognized by the receiver to be a synchronizing signal cluster so that the receiver can re-align the strobe timing reference to it. In detail, the coded synchronizing segments 92 and 94 are inserted into the data segments 91 and 93 for the receiver to decode for a synchronizing signal. For such system it is basically non-synchronized since the synchronizing signal cluster itself has to be correctly read out by means of non-synchronized method. However, the benefit is that the timing skew will not be accumulated along with the time, and in case of any clock misalignment the system will be aware of it immediately since no synchronizing signal cluster be identified any more.

Figure 4:
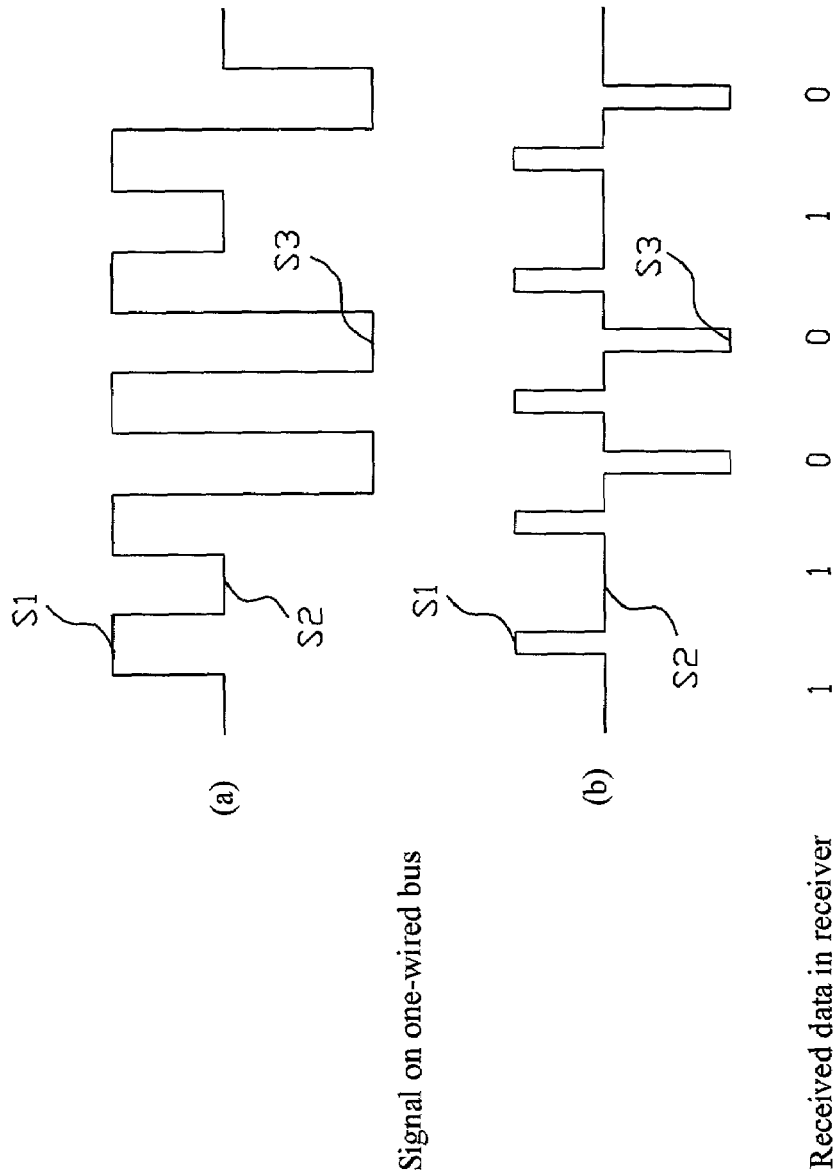
FIG. 4 shows two exemplary data signals (a) and (b) together with synchronizing bits on one-wired bus according to the present invention.
Figure 5:
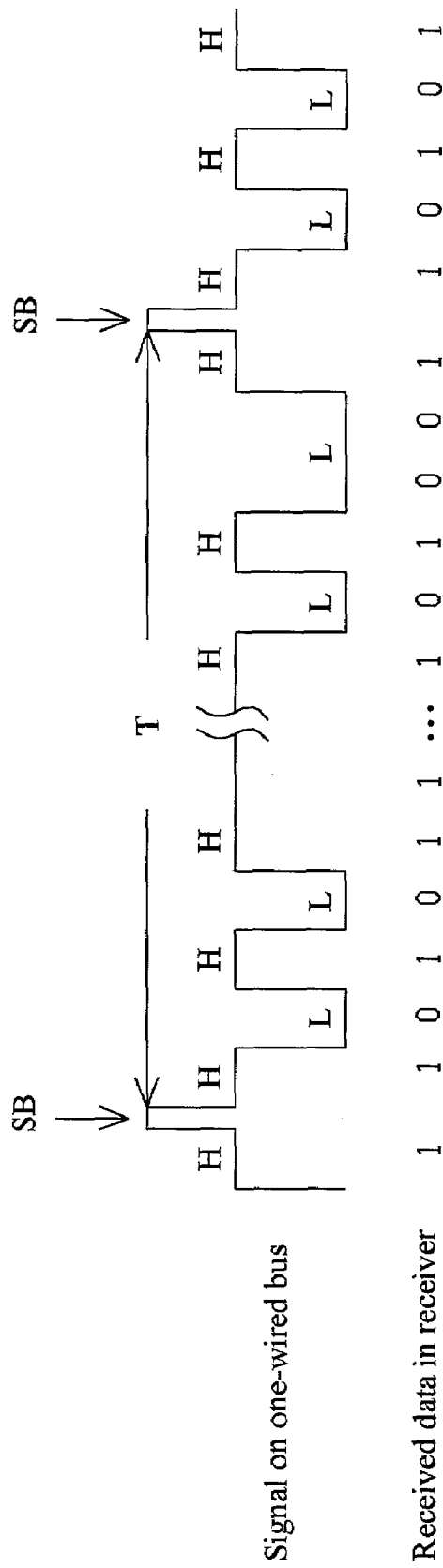
FIG. 5 is another data signal together with synchronizing bits on one-wired bus according to the present invention, in which the data is not synchronized bit by bit, but cluster by cluster.

FIG. 4 shows two exemplary signals (a) and (b) for easy understanding of the scope of the present invention under comparison with that in FIG. 3. There are three electrically distinguishable states S1, S2 and S3 for the signal transmission on a one-wired bus, of which, for example, state S1 represents the synchronizing bit and states S2 and S3 represent logic "1" and "0" respectively. The synchronizing bit S1 is transmitted periodically for synchronization at the receiver end. An alternative exemplary signal is shown in FIG. 5, of which there are also three electrically distinguishable states and, for simplicity and better understanding, denoted with SB for synchronizing bit, "H" for logic "1", and "L" for logic "0". However, adjacent synchronizing bits SB are spaced with a time interval T. As illustrated in FIGS. 4 and 5, the synchronizing signal cluster is electrically distinguishable and needs not decoding effort. No matter how much the clock skewed, the synchronizing bits or clusters can be easily identified in the receiver end by means of recognizing its specific distinguishable electrical characteristics. Furthermore, only a single bit or single transition edge with specific distinguishable electrical characteristics is enough to achieve the synchronizing purpose. The invented scheme can thus have similar performance as that in FIG. 2, but needs only one wire to achieve the performance.

Figure 6:
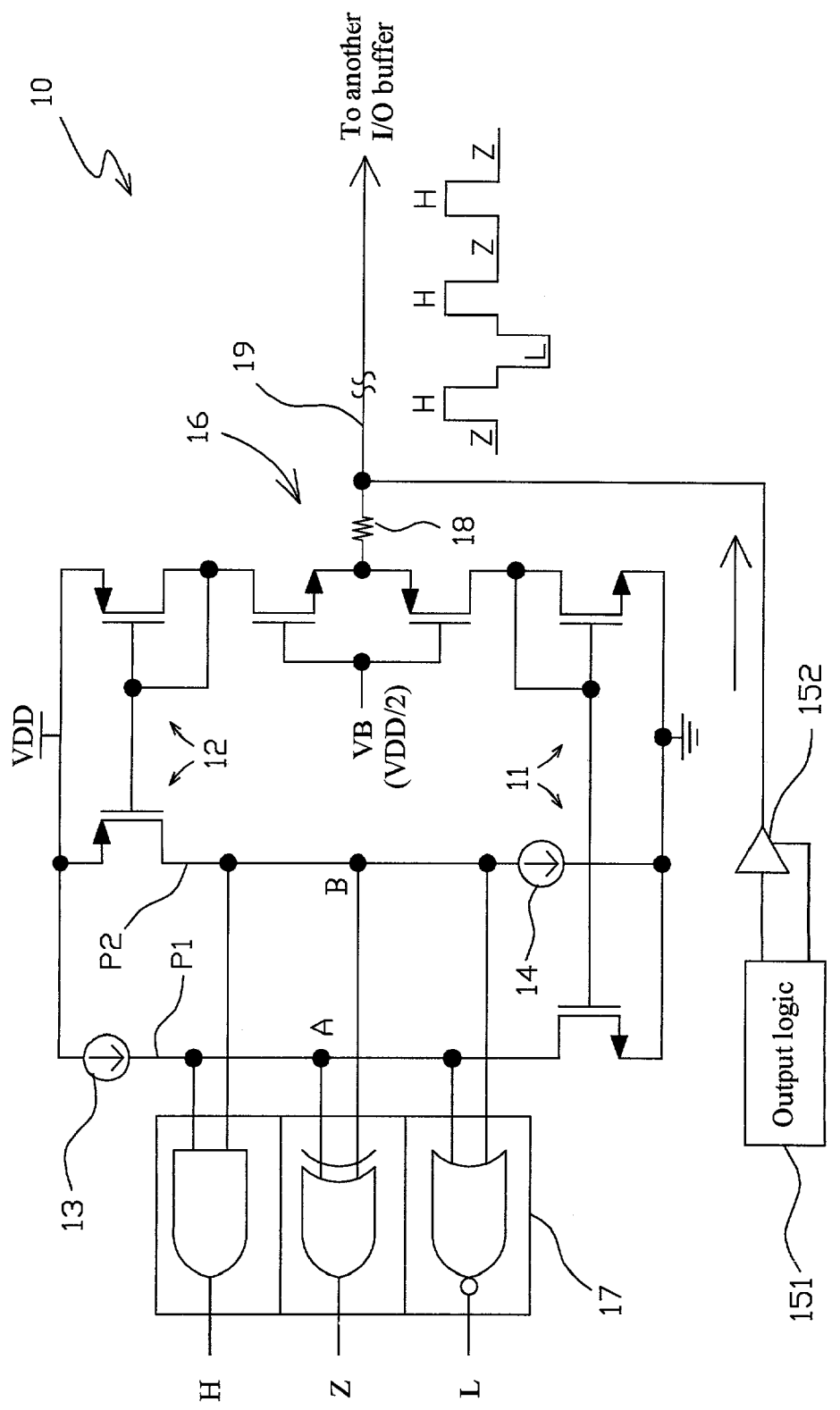
FIG. 6 is an embodiment transceiver circuitry for implementing the one-wired synchronized data communication with three electrically distinguishable states, "High", "Low" and "High impedance (Z-state)"

FIG. 6 is an embodiment transceiver circuit 10 for emphasizing the feasibility and simplicity in circuit implementation. The transceiver circuit 10 includes a transmitter including converter 151 and buffer 152, and a receiver including front end and back end circuit 16 and 17. When transmitting, the binary signals pass through the binary to tri-state signal converter or encoder 151, and then go to the tri-state output buffer 152. Then the tri-state output buffer 152 send out the tri-state signal strings onto the one-wired bus 19, and thus to the receiver on the other end. The transmitted tri-state signal strings include the synchronizing bits or synchronizing signal clusters and the data bits or data signal clusters as described in FIGS. 4 and 5. Among the transmitter circuit, both the encoder 151 and the tri-state output buffer 152 are very mutual circuitry that have been widely used in many integrated circuits, especially for the tri-state output buffer 152 to transmit "High", "Low" and "High-impedance (Hi-Z)" three states.

For the receiver, the transistor level front-end circuit 16 and the gate level back end circuit 17 are clearly plotted in order to prove the circuit feasibility and simplicity. A resistor 18 can be inserted between the one-wired bus 19 and the receiver for limiting current injecting in or out the receiver, and hence helpful for better reliability. However, this resistor 18 is not a necessity.

For operations of the receiver front end 16, when a "High" state signal comes onto the one-wired bus 19, and thus the receiver, a current will flow from the bus 19 into the receiver. The current flows through the NMOS's to VSS or ground. The current is then mirrored in certain designed ratio to another inner path P1 by the NMOS current mirror pair 11. The mirrored current in that inner path P1 competes with a constant current flowing down through the constant current source 13. The constant current is designed in such a value that is less than the "mirrored in current" when a "High" state signal arriving through the one-wired bus 19 to the receiver and, of course, larger than the "mirrored in current" when the arriving signal on the one-wired bus 19 is "Low" state or "High impedance (Hi-Z)" state since the "mirrored in current" is zero at theses situations. Consequently, the voltage on the node A will be a low voltage when the arriving signal on the one-wired bus 19 is a "High" state, and will be a high voltage when the arriving signal on the one-wired bus 19 is a "Low" state or "High impedance (Hi-Z)" state.

In a similar operation way, there is another inner path P2, in which the "mirrored in current" is through the PMOS current mirror pair 12. And on this path P2 there is also a node B, of which the node voltage can reflect the signal state arriving on the one-wired bus 19. In particular, the voltage on the node B will be high when the arriving signal on the one-wired bus 19 is a "Low" state, and will be low when the arriving signal on the one-wired bus 19 is a "High" state or "High impedance (Hi-Z)" state.

Combining the previous two operations, it is obtained the voltage pair on nodes A and B (1.) [Va, Vb]=[low, low]
when the arriving signal on the one-wired bus 19 is a "High" state;

(2.) [Va, Vb]=[high, high]
when the arriving signal on the one-wired bus 19 is a "low" state;

(3.) [Va, Vb]=[high, low]
when the arriving signal on the one-wired bus 19 is a "High impedance (Hi-Z)" state; and (4.) [Va, Vb]=(low, high)
will never happen in this embodiment circuit.

Apparently, the tri-state signal arriving on the one-wired bus 19 can be easily identified with the above-mentioned voltage pair [Va, Vb] state combinations in very simple circuitry. And the logic gates 17 are exactly for doing the described identifications.

Figure 7:
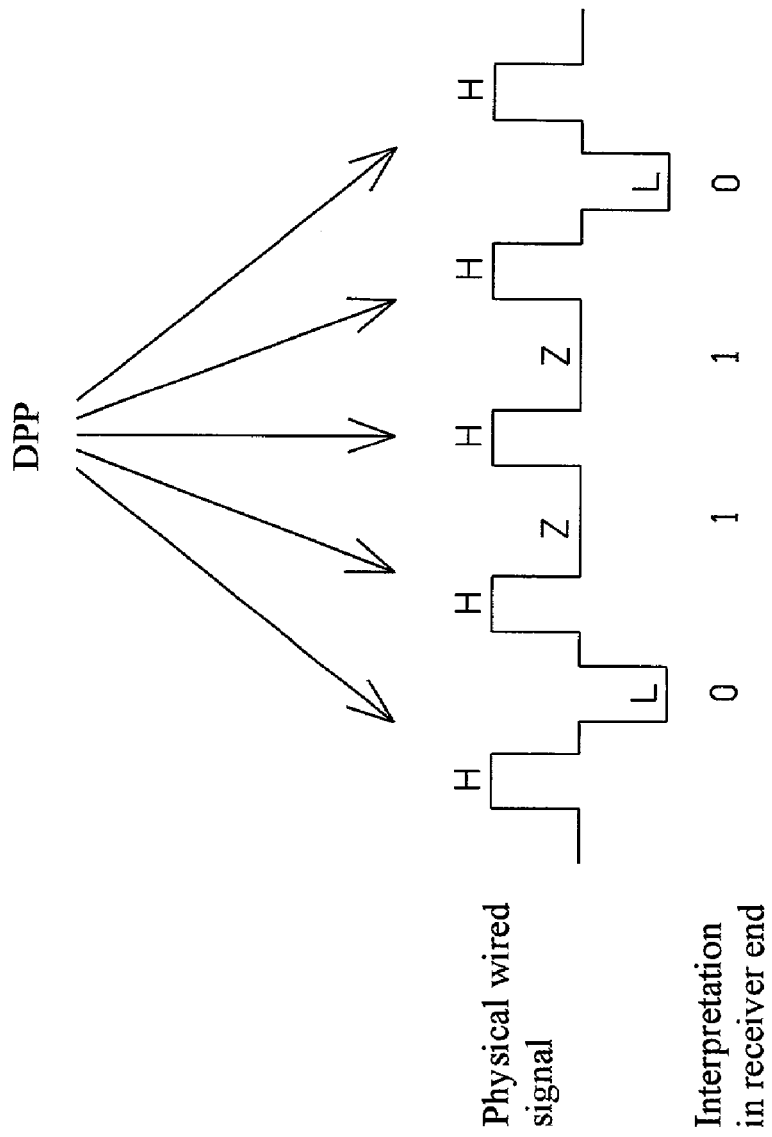
FIG. 7 is a more general description of the signal model according to the present invention, in which the synchronizing signal clusters and data signal clusters can be transmitted and received interleaving without requirement to be periodically.
Figure 8:
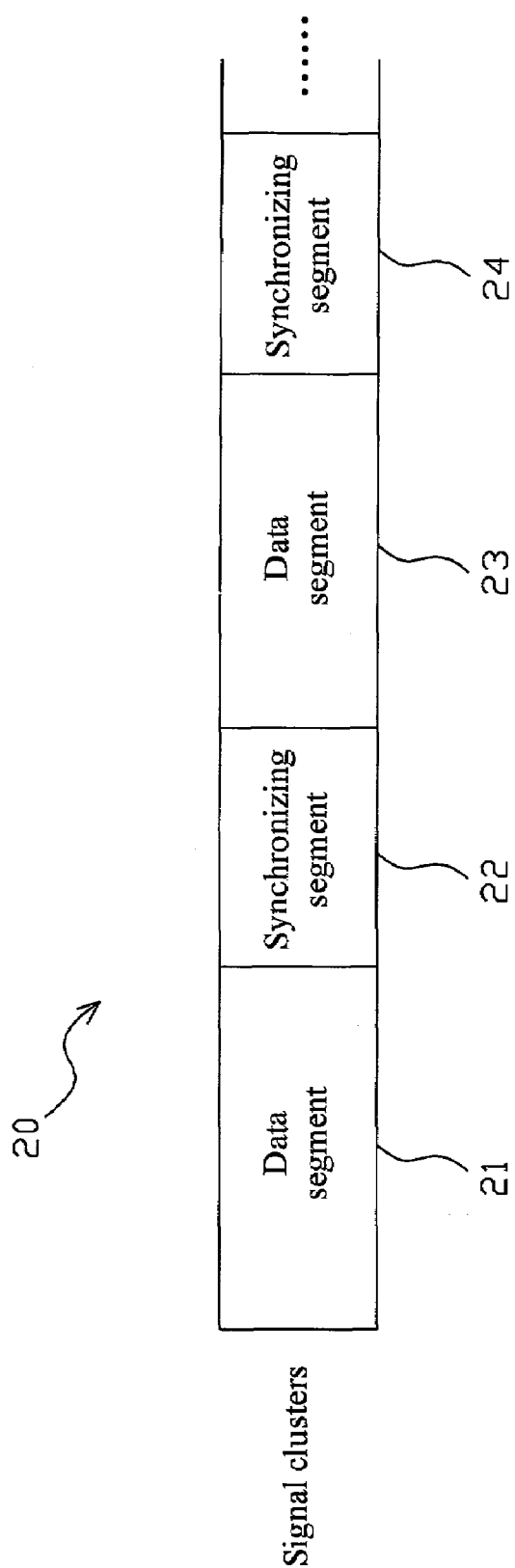
FIG. 8 is a continuous transmission signal cluster of tri-states signal composed of synchronizing signal segments and data signal segments.

In FIG. 7 is shown a continuous transmission signal cluster if tri-state signal is formed by three different signal statuses, which can be divided into three electrically distinguishable states "High", "Low" and "High-impedance (Hi-Z)". In this embodiment, "High" state is selected to be the synchronizing signal and thus the data partition pulse DPP due to periodic insertion in the transmitted signal, and "High-impedance (Hi-Z)" state and "Low" state represent logic "1" and "0" for data respectively. An alternative representation for this embodiment signal is shown in FIG. 8, and the continuous transmission signal cluster 20 of tri-state signal is composed of synchronizing signal segments 22 and 24 and data signal segments 21 and 23. The continuous transmission signal cluster 20 of tri-state signal transmits synchronizing signal segment 22 in between the data signal segments 21 and 23 during the process. That is, between the synchronizing signal segments 22 and 24 is the data signal segment 23.

The synchronizing signals DPP's provide the function that defines the cycle and synchronicity of the signal transmission. The function of cycle and synchronicity of the transmission signal can increase endurance of the signal's frequency displacement, be against to the influence of variation of the condition parameters and also more resistant to influences of the interference of external conditions, low quality of transmission medium, and improve limitation of transmission distance, reliability and correctness of the signal transmission substantially.

For better understanding of the three electrically distinguishable states, in FIGS. 4 and 5 state S2 represents the logic signal "High", state S3 represents the logic signal "Low", and state S1 represents the third state for synchronizing signal, and the most easy way for implementing the third state is to make use of electrically "High impedance" state. For example, FIG. 6 is a simple and feasible circuit for implementing the transmitter and receiver. Moreover, when the transceiver 10 shown in FIG. 6 is employed, the selection from the three electrically distinguishable states to be the synchronizing signal and data signal is arbitrary. In other words, the physical high voltage on the bus may not be the logic "1" for data signal. However, the "High" state and "Low" state are preferred to be the synchronizing signal. In particular, referring to FIGS. 7, 4 and 5, during transmission any one of the three electrically distinguishable states can be assigned to form the synchronizing signal segment or synchronizing bit. The synchronizing signal segment can also be formed with sequential combination of the three electrically distinguishable states. According to the present invention, for the synchronized data string to be easily transmitted, received and identified, the synchronizing signal segment should include the specifically assigned electrical state that is not used for representing the logical meanings of the data signal segments. Then the data signal segment can be constructed with a single bit or a sequential combination of the other two electrical states other than the electrical state assigned for synchronizing signal. The two electrical states used for the data signal bits or for forming the data signal segments represent the logic "High" and "Low", or "1" and "0", meanings respectively. The two electrical states should not include the specifically assigned state used for the synchronizing bit or for forming the synchronizing signal segments.

An alternative embodiment is to use the transition edges between the three distinguishable electrical states. Referring to FIG. 4, many kinds of different transitions can be identified, they are S1 to S2, S2 to S1, S2 to S3, S3 to S2, S1 to S3, and S3 to S1 transitions. Likewise, any one of the six transition edges can be defined as the key identifier of the synchronizing signal, and the transition edge itself or a sequential combination of levels or edges including it can also be used for the synchronizing signal for the one-wired bus synchronized communications. In this way, the other five transition edges or sequential combinations of them can be appropriately arranged for representing the logic data meanings in binary mode or even in multi-level modes.

Further, the combinations of the above-mentioned embodiments with level state and edge state may be employed, that is, to make use of electrical states and transition edges at the same time can be trivially implemented with the same technology.

From the above description, the invented scheme for synchronized data communication on a one-wired bus is proven feasible and cost effective. And it can increase endurance of the signal's frequency displacement and resist influences of the interference of external conditions, low quality of transmission medium, and limitation of transmission distance, to make the reliability and correctness of the signal transmission improve substantially. Therefore, the single transmission medium reduces the resource wasting and cost.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. A method for synchronized data communication on a one-wired bus, comprising the steps of:
defining three electrically distinguishable states of a signal;
selecting one state from said three-states for a synchronizing signal and remaining states of said thee-states for a data signal;

forming a tri-state transmission signal including said three-states;
transmitting said tri-state transmission signal over a one-wired bus; and
interpreting said tri-state transmission in accordance with said three-states.

2. The method of claim 1, further comprising the step of:
defining a key identifier by the state for the synchronizing signal.

3. The method of claim 2, wherein the key identifier determines a synchronizing bit.

4. A method for synchronized data communication on a one-wired bus, comprising the steps of:
defining first, second and third electrically distinguishable states for a signal;
selecting said first state to identify a synchronizing signal;
defining a key identifier by said first state; and
defining a synchronizing duster including said key identifier to determine the synchronizing signal;
selecting said second and third states to identify a binary data signal;
transmitting on a one-wired bus a tri-state signal comprising said synchronizing cluster containing said key identifier defined by said first state and said binary data signal defined by said second and third states; and
interpreting said transmitted tri-state signal in accordance with said first, second and third states.

5. The method of claim 2, wherein the key identifier is a voltage level or transition edge.

6. The method of claim 1, wherein the other states for the data signal determine logic values with voltage levels thereof or transition edges therebetween.

7. The method of claim 1, wherein the tri-state signal includes a periodic appearance of said one state for the synchronizing signal with a time interval.

8. The method of claim 7, wherein the time interval determines a transmission cycle.

9. The method of claim 7, wherein the time interval determines a data cycle.

10. The method of claim 1, wherein the synchronizing signal includes a plurality of synchronizing clusters and the data signal includes a plurality of data clusters, and wherein each of the synchronizing clusters is inserted between two of the data clusters.

11. A system for synchronized data communication on a one-wired bus comprising:
first, second and third electrically distinguishable states of a signal;
the first state being selected from the three electrically distinguishable states for a synchronizing signal and the second and third states being selected from the three electrically distinguishable states for a data signal;
a one-wired bus; and
a tri-state transmission signal incorporating said first, second and third electrically distinguishable states for transmission over said one-wired bus.

12. The system of claim 11, further comprising a key identifier determined by the first state.

13. The system of claim 12, wherein the key identifier determines a synchronizing bit.

14. The system of claim 12, wherein the key identifier is a voltage level or transition edge.

15. A system for synchronized data communication on a one-wired bus comprising:
three electrically distinguishable states;
a first state selected from the three electrically distinguishable states for a synchronizing signal and second and third states selected from the three electrically distinguishable states for a data signal;
a key identifier determined by the first state; and
a tri-state transmission signal formed with the three electrically distinguishable states, said tri-state transmission signal comprising a plurality of synchronizing clusters, each including the key identifier.

16. The system of claim 15, further comprising a transmission cycle determined by two of the synchronizing clusters.

17. The system of claim 15, further comprising a data cycle determined by two of the synchronizing clusters.

18. The system of claim 11, wherein the second and third states determine logic values with voltage levels thereof or transition edges therebetween.

19. The system of claim 18, further comprising a plurality of data clusters each including any one of the logic values.

20. The system of claim 11, wherein the tri-state signal includes a periodic appearance of the first state with a time interval.

21. The system of claim 11, wherein the three electrically distinguishable states are high voltage level, low voltage level and high impedance state.

22. A transceiver for synchronized data communication on one-wired bus comprising:
means for generating three electrically distinguishable states;
a tri-state output buffer for generating a tri-state signal formed with the three electrically distinguishable states;
an input buffer for receiving a transmitted signal formed with the three electrically distinguishable states;
means for determining an input state from the transmitted signal to be one of the three electrically distinguishable states;
means for generating a first reference current responsive to the input buffer;
means for generating a first mirrored current responsive to the first reference current;
means for generating a first voltage responsive to the first mirrored current;
means for generating a second reference current responsive to the input buffer;
means for generating a second mirrored current responsive to the second reference current;
means for generating a second voltage responsive to the second mirrored current; and
means for determining the input state by comparison of the first and second voltages.

23. The transceiver of claim 22, wherein the three electrically distinguishable states are high voltage level, low voltage level and high impedance state.

* * * * *